Sept. 19, 1967    T. W. WALDROP    3,342,230
FORAGE HARVESTER HAVING DETACHABLE FAN ELEMENTS
Filed June 2, 1965
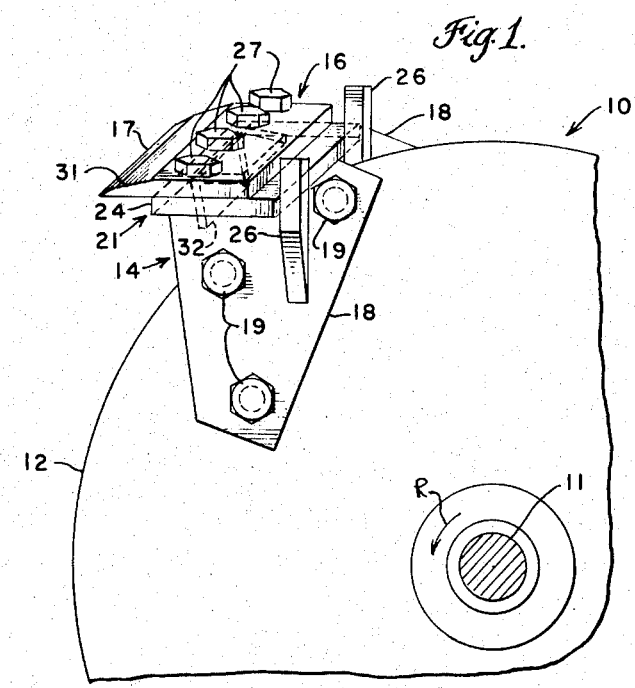
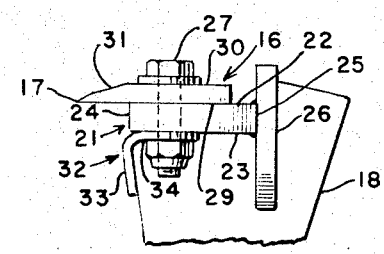
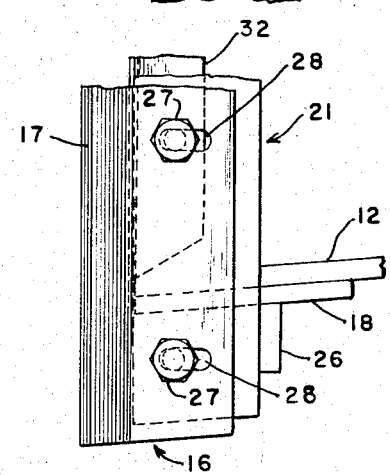
INVENTOR.
Thomas W. Waldrop
BY
Joseph A. Brown
ATTORNEY

United States Patent Office 3,342,230
Patented Sept. 19, 1967

3,342,230
FORAGE HARVESTER HAVING DETACHABLE FAN ELEMENTS
Thomas W. Waldrop, Ronks, Pa., assignor to Sperry Rand Corporation, New Holland, Pa., a corporation of Delaware
Filed June 2, 1965, Ser. No. 460,735
5 Claims. (Cl. 146—107)

ABSTRACT OF THE DISCLOSURE

A forage harvester having a cutter of the reel or cylinder type in which fan elements are detachably mounted adjacent the cutter knives for increasing the throwing capacity of the cutter.

This invention relates to forage harvesters. More particularly, the invention relates to a rotary cutter of the reel or cylinder type for a forage harvester.

A forage harvester, of the type to which this invention is particularly applicable, comprises generally a pick-up mechanism for delivering crop material onto an apron conveyor, feed rolls which receive material from the conveyor and deliver it to be chopped, and a chopper unit which functions to comminute the crop material and discharge it at a high velocity to a trailing wagon. One example of the type of forage harvester referred to is shown in U.S. Patent No. 2,735,469.

The chopper unit in the patent consists of a cylindrical housing, a stationary shear bar mounted along the outer periphery of the housing, and a rotary cutter which cooperates with the shear bar to produce the chopping action. The rotary cutter, in addition to performing the chopping function, also serves as a blower and thrower means. Various arrangements are used to provide the cutter with the necessary structure. One of the most common methods, and the one used in the cited patent, is to integrally incorporate a fan surface in the knife support structure. Trough-shaped blade elements are also used to achieve the necessary action.

The forage harvester cutter and blower units, as described, function well in most types of crops and crop conditions. Two main problems exist, however, with these types of units. The first of these problems is the high power consumption. It has been found that under many harvesting conditions, e.g., where the crop material is relatively dry, wide fan surfaces are not needed; and the power consumption can be materially reduced if the fan surfaces were eliminated, leaving only the knife and knife mounting structure. The second problem with integrally formed fan surfaces on the knife support structures and with complex blade shapes is that both of these designs are difficult and costly to manufacture. Normally, the cutter turns at somewhere between eight-hundred and a thousand r.p.m., and it is usual to process many tons of crop material through the cutter per hour. Thus, it is evident that the cutter is subject to high stresses and a large amount of wear and tear. The ideal cutter would be one that could take this type of punishment, would consume a minimum amount of power, and at the same time be inexpensive to manufacture.

Accordingly, one object of this invention is to provide a forage harvester cutter of the character described with a novel and improved cutter construction.

Another object of this invention is to provide a cutter of the character described with means to vary the blower throwing capacity to adapt the unit to varying crop conditions.

Another object of this invention is to provide a cutter of the character described wherein the means for increasing the blower capacity of the cutter is detachable.

A further object of this invention is to provide a cutter of the character described which will consume less power under a variety of operating conditions.

A still further object of this invention is to provide a cutter of the character described which is lighter, less expensive to manufacture, efficient, and extremely versatile.

Other objects of this invention will be apparent hereinafter from the specification and from the recital in the appended claims.

In the drawings:

FIG. 1 is a fragmentary view of a harvester cutter constructed according to this invention and showing the relative locations of the shaft, end disc, and knife mounting.

FIG. 2 is a partial end view of the knife support and showing the cutter knife and the fan element mounted on the knife support plate; and FIG. 3 is a top plan view of the knife mounting and showing the fan element end portion.

Referring now to the drawing by numerals of reference and particularly to FIG. 1, 10 denotes forage harvester cutter having a shaft 11 which rotatably supports the cutter or reel and has at least two axially spaced end discs, one of which is shown at 12. Carried between discs 12 are a plurality of knife mounting supports 14, each of which carries a knife 16. In the drawing, only one knife and support structure is shown. It is understood, however, that there are a number of knives angularly spaced around the cutter to successively cooperate, etc.

Each of the knife mounting supports 14 comprises a pair of substantially triangular mounting brackets 18. Each bracket 18 is connected to an end disc 12 and is held thereto by three mounting bolts 19. A thick flat knife support plate 21 having a substantially rectangular cross-section extends across the axially spaced brackets 18 and is affixed to the brackets by welding or other means. With reference to FIG. 2, support plate 21 has a flat top side 22 against which knife 16 abuts, an underside 23 parallel to the top side, and end walls 24, 25 which are perpendicular to the top side 22 and underside 23. End wall 24 forms the leading end of support plate 21 as it is rotated in a counterclockwise direction, indicated by the arrow R in FIG. 1. A pair of vertical elements 26 are affixed to the support plate on end wall 25 opposite end wall 24, and the elements are also affixed to their respective mounting brackets 18. Elements 26 serve to brace the knife mounting supports 14 and are adapted to receive set screws (not shown) which bear against the knife 16 to adjustably hold it in place.

Knife 16 is mounted on support plate 21 and is held thereon by bolts 27 which pass through slots 28 in the knife central portion. Knife 16 is formed with a flat underside 29 and a top side having a flat rear portion 30 and a forward tapered section 31 which terminates in knife cutting edge 17. As shown in FIGS. 1 and 2, the tapered forward section 31 projects beyond support plate 21, and the underside of section 31 forms an angular pocket with end wall 24. The knife 16 is arranged on the cutter with its edge 17 diagonal relative to the cutter axis of rotation to cooperate with a stationary shear bar (not shown) in cutting material processed by the cutter. The knife 16 is so formed that the knife edge 17 is located the same radial distance from the shaft 11 along its axial extent and on rotation of the cutter generates a cylinder.

As best shown in FIG. 2, a blower fan element 32 may be mounted on underside 23 of the knife support plate. The blower fan element 32 is substantially L-shaped in cross-section having a front side or face 33 and a second side 34. The fan element 32 is connected to the support plate 21, with side 34 abutting against underside 23 of the support plate and with front face 33 generally in line with end wall 24. The fan element 32 is secured to the support plate by two of the knife mounting bolts 27. The fan element extends axially substantially from one end disc 12 to the other (see FIG. 3).

In the operation of the cutter, the knives 16 are rotated at a high r.p.m. and cooperate with a shear bar (not shown) to chop the crop material fed into the chopper unit. As the cutter knife advances past the shear bar, the cut material is trapped in a pocket formed by the undersurface of the tapered knife section 31 and the end wall 24 of the knife support, and the material is thrown off tangentially to the cylinder of rotation and into the discharge pipe. Under some crop conditions, this pocket formed by the knife forward section 31 and the knife support leading edge 24 is sufficient to provide the desired flow velocity of the material. However, in wet or semi-cured material, it is necessary to have additional blowing power. This additional power is provided by the blower fan elements 32 which may be installed on the cutter as needed. In some operations, it will be necessary to install blower fan elements on only a portion of the knives; in others, it will be necessary to put them on each of the knives to attain the maximum blower capacity. As shown in FIG. 2, the front face 33 of the blower fan element 32 forms an extension of the end wall 24, thus catching any material which may get past the end wall.

With the cutter described, a clean cutting action is obtained with low power consumption and adequate "blow" for many crop conditions when the knife mounting is used without the blower fan elements 32. When additional blower power is required, the fan elements are easily installed and provide this additional power. Therefore, an extremely efficient cutter is in use at all times and the high power consuming blower means are only used when needed.

An additional feature of this invention is the inexpensive and light construction which results from the disclosed arrangement. The welding is kept to a minimum in applicant's knife support and no machining is required after the support is assembled.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A forage harvester cutter comprising a rotatable shaft, disc means mounted on said shaft and extending outwardly relative thereto, at least two brackets on said disc means radially outwardly of said shaft and spaced relative to each other in an axial direction relative to the shaft, a thick flat support plate generally rectangular in cross section and extending between said brackets and having ends supported thereon, said support plate projecting generally tangentially relative to said disc means, a flat knife mounted on one flat side of said support plate and coextensive therewith, means connecting said knife to said support plate, said knife having a section projecting outwardly of said support plate and said section having a cutting edge, said support plate having an end wall adjacent said knife section generally perpendicular to the knife, said wall being inwardly of and behind said cutting edge relative to the direction of travel of said shaft, a fan element mounted on the side of said support plate opposite said one side and having a front face adjacent and generally coextensive with said end wall, and means for detachably connecting said fan element to said support plate whereby when said element is in place the blowing action of said cutter is increased and when removed said opposite side of said support plate is substantially unobstructed.

2. A cutter, as recited in claim 1, wherein said fan element is substantially L-shaped in cross section, a second side of said element joins said front face along a line parallel to and substantially in line with said end wall, and said second side abuts against the side of said support plate opposite said one side.

3. A forage harvester cutter comprising a rotatable shaft, radially extending mounting means axially spaced on said shaft, a support plate extending between and supported on said mounting means, a cutter knife mounted on one side of said support plate and having a cutting edge thereon, a fan element detachably mounted to an opposite side of the support plate, said element having a front face extending generally parallel to said cutting edge, and said front face extending at an angle to said opposite side.

4. A forage harvester, as recited in claim 3, wherein said opposite side is parallel to said one side, and said fan element has a generally L-shaped cross section.

5. A forage harvester, as recited in claim 4, wherein said support plate has an end wall substantially perpendicular to said one side, and said front face is generally in line with said end wall.

References Cited

UNITED STATES PATENTS

| | | | |
|---|---|---|---|
| 1,353,261 | 9/1920 | Morgal | 146—107 |
| 2,679,873 | 6/1954 | Hill | 146—107 |
| 2,735,469 | 2/1956 | West | 146—117 |
| 2,848,029 | 8/1958 | West | 146—107 |
| 3,023,560 | 3/1962 | Krahn | 56—23 |

W. GRAYDON ABERCROMBIE, *Primary Examiner.*